United States Patent
Komuro

[11] Patent Number: 4,679,647
[45] Date of Patent: Jul. 14, 1987

[54] REAR SEAT COVER FOR VEHICLES HAVING A SADDLE-SHAPED SEAT

[75] Inventor: Katsusuke Komuro, Chofu, Japan
[73] Assignee: Honda Giken Kogyo Kabushiki Kaisha, Tokyo, Japan
[21] Appl. No.: 867,838
[22] Filed: May 28, 1986
[30] Foreign Application Priority Data
  May 29, 1985 [JP] Japan .............................. 60-80712[U]
[51] Int. Cl.[4] ................................................ B62J 1/08
[52] U.S. Cl. ................................ 180/219; 280/289 A; 297/243
[58] Field of Search ............... 280/202, 289 A, 289 E, 280/289 R; 297/243, 378; 224/32; 180/219

[56] References Cited

U.S. PATENT DOCUMENTS 3,580,630  5/1971  Fetter .................................. 297/378
3,625,405 12/1971  Kezar .................................. 280/202
4,095,820  6/1978  Hanagan ......................... 280/289 A

FOREIGN PATENT DOCUMENTS 58-188768 11/1983 Japan .................................. 180/219

Primary Examiner—John J. Love
Assistant Examiner—Donn McGiehan
Attorney, Agent, or Firm—Armstrong, Nikaido, Marmelstein & Kubovcik

[57] ABSTRACT

In motorcycles, motor-tricycles, snow-mobiles, etc. provided with a tandem seat so as to enable tandem riding, a rear end of a rear seat cover which covers a rear seat portion of the tandem seat upon single riding, is swingably supported at a fixing portion on the vehicle body side behind the rear seat portion, and there is provided a stopper for restraing the swinging motion of the rear seat cover at a predetermined rising angle when the rear seat cover has been made to swing in the rising direction. This rear seat cover need not be dismounted even upon tandem riding, but it is utilized as a back rest device upon tandem riding.

3 Claims, 4 Drawing Figures

REAR SEAT COVER FOR VEHICLES HAVING A SADDLE-SHAPED SEAT

BACKGROUND OF THE INVENTION

The present invention relates to a rear seat cover for vehicles having a saddle-shaped tandem seat such as, for example, motorcycles, motor-tricycles, snow-mobiles, etc.

Among motorcycles or the like provided with a tandem seat those adapted to cover a rear seat portion of the tandem seat upon single-person riding have been known. For example, a rear seat covering device for motorcycles is disclosed in Laid-Open Japanese Patent Specification No. 58-188768.

The objects of this rear seat covering device are to prevent the rear seat portion from getting dirty and to simplify the appearance from a view point of design. Also it enables to reduce an air resistance and to utilize the rear seat portion as an article receptacle portion upon single-person riding. In the rear seat covering device, a cover adapted to cover a rear seat portion of a tandem seat provided at the upper portion of a vehicle body from the above, is swingably and detachable mounted by pivotably supporting it at a middle position between the rear seat. Taking in and out of articles to and from the articles receptacle portion is facilitated by making the cover swingable.

However, the above-referred rear seat covering device for motorcycles involves various problems such that upon tandem riding, unless the cover is dismounted, a passenger cannot comfortably ride on the rear seat portion. Moreover since a motorcycle itself is not provided with a space for accommodating the dismounted rear seat cover, the place were operations for mounting and dismounting of the rear seat cover are carried out is mostly limited to predetermined locations such as a garage, and if the necessity for dismounting the cover arises during touring, it is very inconvenient because the dismounted rear seat cover must be brought back by binding it to a rear carrier.

SUMMARY OF THE INVENTION

The present invention has been worked out in view of the above-mentioned problems in the prior art, and it is one object of the present invention to provide a rear seat cover for vehicles having a saddle-shaped seat, which should not be dismounted even upon tandem riding, and which can be utilized as a back rest for a rear seat portion upon tandem riding.

The present invention is characterized by the fact that in a rear seat cover for vehicles having a saddle-shaped seat, which rear seat cover covers a rear seat portion of a tandem seat provided at the upper portion of a vehicle body from the above, the rear end of the rear seat cover is swingably supported at a fixing portion on the vehicle body side behind the rear seat portion, and there is provided a stopper for restraining the swinging motion of the rear seat cover at a predetermined rising angle when the rear seat cover has been made to swing in the rising direction.

Owing to the above-mentioned construction, the rear seat cover covers the surface of the rear seat portion of the tandem seat upon one person riding. Upon tandem riding, the rear seat cover is lifted at a predetermined angle, then the rear seat portion is available for a passenger and also the rear seat cover serves as a back rest device for the passenger on the rear seat portion.

The above-mentioned and other objects, features and advantages of the present invention will become more apparent from the following description of the invention with reference to the accompanying drawings.

DESCRIPTION OF THE PREFERRED EMBODIMENTS

Figure 1:
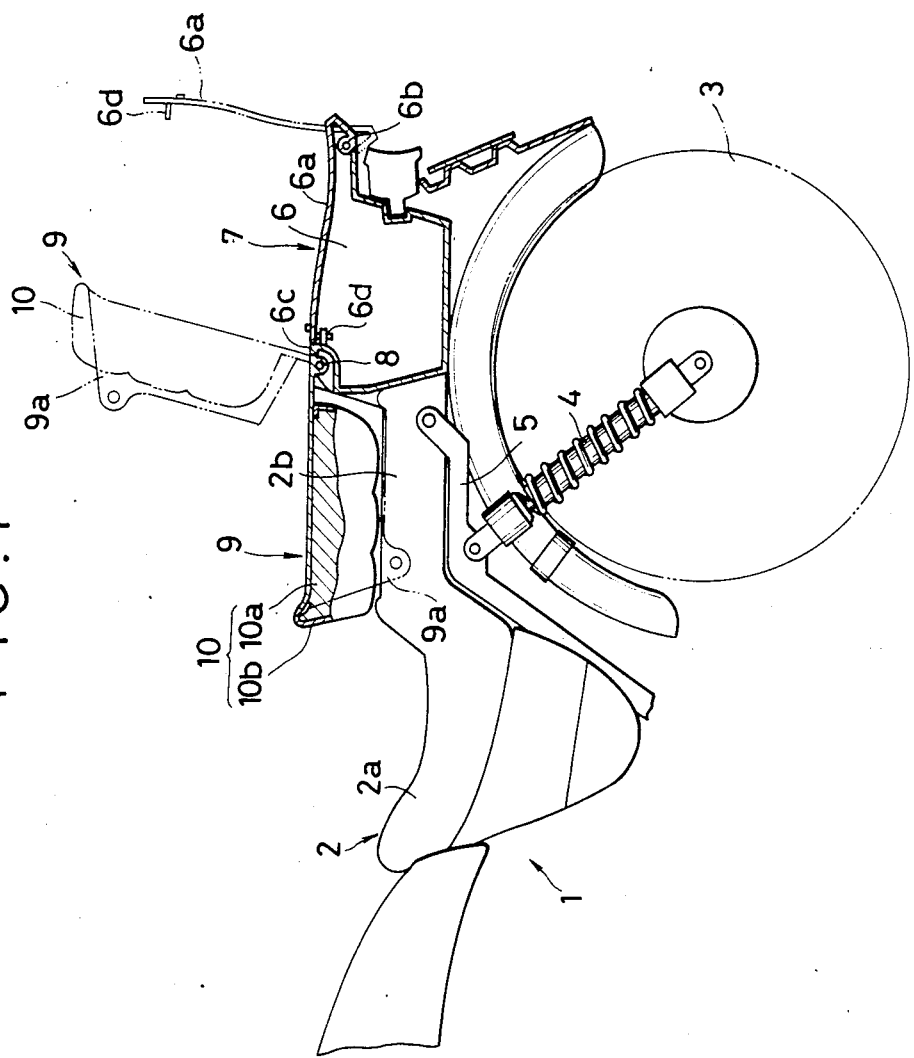
FIG. 1 is a side view partly in cross-section of a rear portion of a motorcycle according to one preferred embodiment of the present invention.

FIG. 1 shows one preferred embodiment of the present invention. At the upper portion of a vehicle body 1 of a motorcycle, a tandem seat 2 consisting of front seat portion 2a on the front side of the vehicle body (on the left side as viewed in FIG. 1) and a rear seat portion 2b on the rear side of the vehicle body is provided as supported by seat pipes (not shown), and under the above-mentioned rear seat portion 2b, a rear wheel 3 is pivotably supported by a rear fork (not shown) and is rockably suspended from frame 5 through rear cushions 4.

In addition, behind the rear seat portion 2b of the above-mentioned tandem seat 2, a rear cowl 7 having an accommodating box section 6 formed integrally therewith is supported by rear pipes (not shown) extended almost horizontally from the above-mentioned frame 5 to the rear, and is disposed in such manner that the front end of the above-mentioned accommodating box section 6 may adjoin the rear end of the rear seat portion 2b. The above-mentioned rear cowl 7 covers the top and the sides of a rear fender as well as the rear portion of the vehicle body. The top surface of the accommodating box section 6 which takes a higher level than the seat surface of the rear seat portion 2b, is provided with a lid portion 6a so that it can be opened and closed about a pivot at a rear hinge portion 6b.

Further, at the upper portion on the front side of the accommodating box section 6 of the rear cowl 7 adjoining the rear end of the rear seat portion 2b, provided is a pivot 8 and a rear seat cover 9 is swingably mounted to that pivot 8.

This rear seat cover 9 is provided with a cushion 10 made of soft cushion material 10a wrapped with a vinyl sheet 10b. Provided at the opposite sides of the rear seat cover 9 are locking devices 9a for fixing the rear seat cover 9 upon the rear seat portion 2b by hooking the same so as to cover the rear seat portion 2b from the top.

In addition, in the proximity of the pivot 8 provided at the accommodating box section 6 of the rear cowl 7, is a stopper section 6c which restrains the swinging of the rear seat cover 9 to a predetermined angle when it takes an upright position which is beyond the perpendicular line. Reference numeral 6d designates a lid lock of the accommodating box section 6.

The rear seat cover 9 designed in the above-described manner swings forwardly to cover the rear seat portion 2b of the tandem seat 2 upon one person riding, thereby adhesion of dirt and dust to the rear seat portion 2b can be prevented. Also since the outer surface of the rear seat cover 9 becomes continuous to the top surface of the rear cowl 7 at the same level when it covers the rear seat portion 2b, the appearance becomes simple, resulting in excellent design, and an air resistance is reduced.

Then, upon tandem riding, by swinging the rear seat cover 9 upright until swinging is restrained by the stopper section 6c, the rear seat portion 2b becomes available for a passenger even without dismounting the rear seat cover. Also the rear seat cover 9 of upright position serves as a back rest and the cushion 10 of the rear seat cover 9 serves as a back cushion for the passenger on the rear seat portion 2b.

Figure 2:
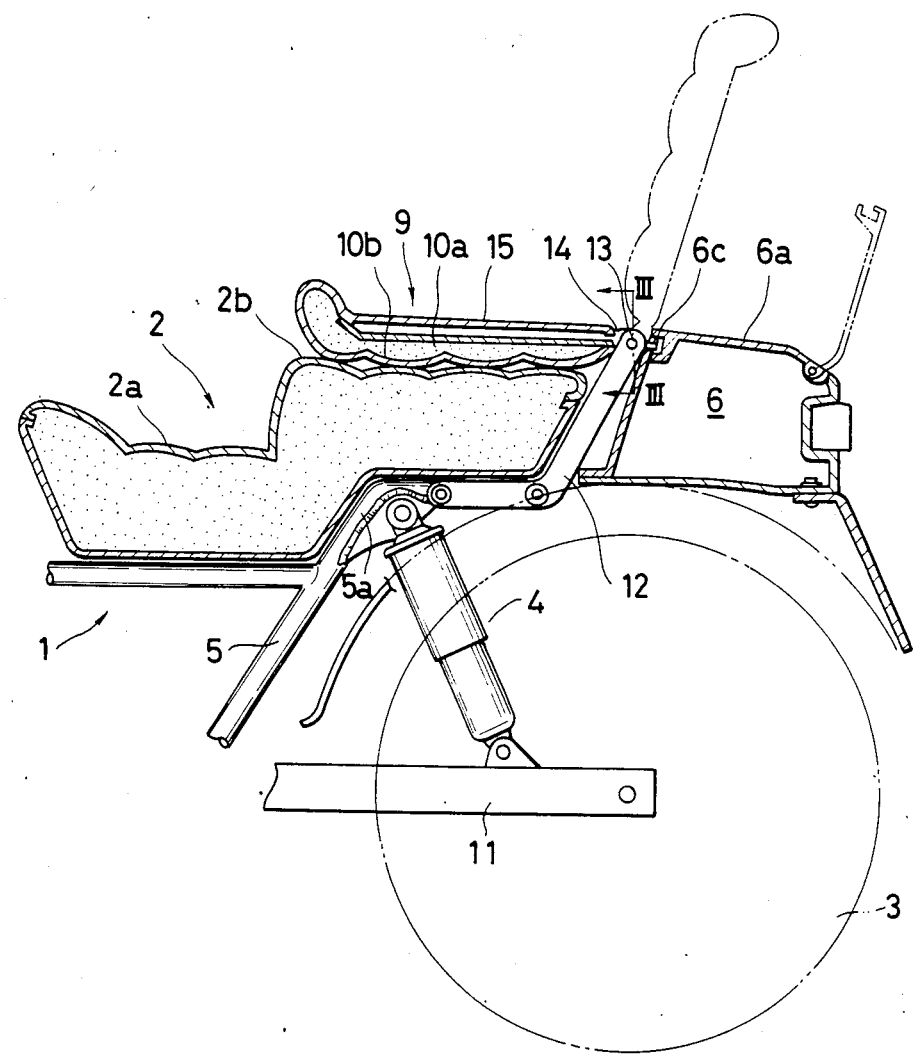
FIG. 2 is a side view partly in cross-section similar to FIG. 1, showing another preferred embodiment of the present invention.

FIG. 2 shows another preferred embodiment of the present invention, and component parts equivalent to those shown in FIG. 1 are given same reference numerals. A rear wheel 3 is rotatably supported at the rear end of a rear fork 11 swingably supported from a vehicle body frame 5 and extending backwards from the same. Provided between the rear fork 11 and the vehicle body frame 5 are rear cushions 4. At the upper portion of the vehicle body frame 5, a saddle-shaped tandem seat 2 is fixed.

Provided behind the tandem seat 2 is an accommodating box 6. This accommodating box 6 is fixed to the vehicle body frame 5 by appropriate stay members, and various articles can be put into and taken out of the accommodating box 6 through its upper opening by opening and closing a lid 6a. As shown in FIG. 2, the level of the top surface of this accommodating box 6 is higher than the level of the top surface of the rear seat portion 2b.

Figure 3:
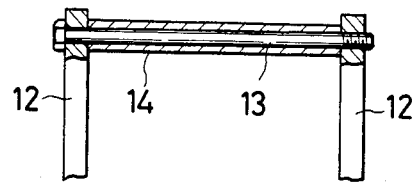
FIG. 3 is a cross-section view taken along line III—III in FIG. 2.

Rear seat cover support members 12 are fixed to a pair of left and right frame members 5a which support the rear portion of the tandem seat 2 from the below. These rear seat cover support members 12 extend upwards through a space between the rear seat portion 2b of the tandem seat 2 and the accommodating box 6 and their top ends are positioned substantially at the same level as high as the top surface of the accommodating box 6. At these top end portions, as shown in FIG. 3, a shaft member 13 is bridged between the left and right rear seat cover support members 12, and a rear end portion of the rear seat cover 9 is pivotably mounted to this shaft member 13.

The rear seat cover 9 is provided with a rigid back plate portion 15 extending integrally from a pivotal mount portion 14 pivotably mounted to the shaft member 13, and is reinforced by the back plate portion 15. Provided at another side of this back plate portion 15 facing to the rear seat portion 2b, is cushion material 10a, and the surface of the cushion material 10a is covered by a surface skin 10b. This rear seat cover 9 can freely swing around the shaft member 13 between a level position in which it is faced down upon the rear seat portion 2b to cover the upper surface of the rear seat portion 2b as shown by solid lines in FIG. 2 and an upright position in which it takes a nearly perpendicular position as shown by dotted lines in FIG. 2. At the upright position the rear seat cover 9 is held at a predetermined upright angle by means of an appropriate stopper 6c provided, for example, at the front edge portion of the lid 6a. The illustrated rear seat cover 9 is reinforced by the rigid back plate portion 15 and also it is firmly supported from the vehicle body by means of the rear seat cover support members 12, so that it is provided with a sufficient strength for serving as a back rest.

Figure 4:
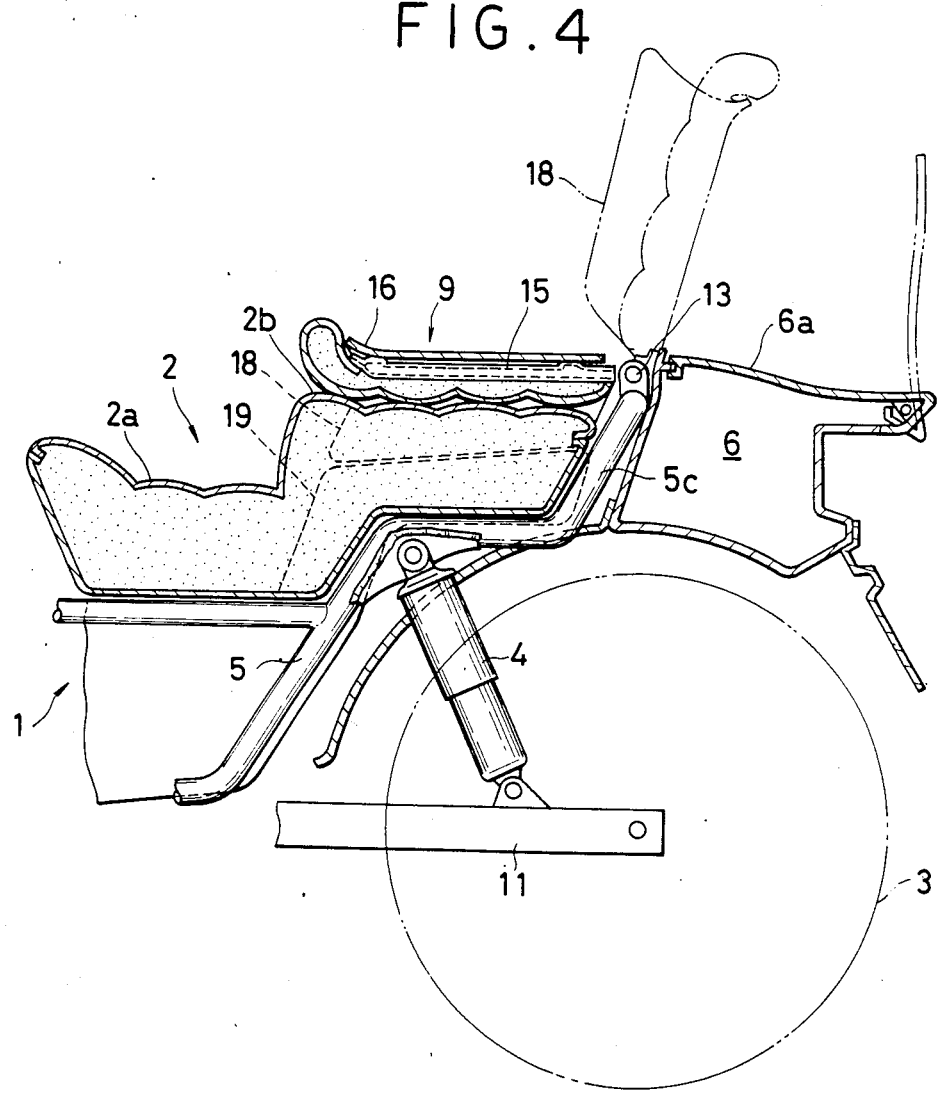
FIG. 4 is a side view partly in cross-section similar to FIG. 1, showing still another preferred embodiment of the present invention.

FIG. 4 shows still another preferred embodiment of the present invention. In this particular embodiment, extensions 5c of a vehicle body frame 5 serve as rear seat cover supporting members. A pair of left and right extensions 5c adjoining the rear upper portion of the vehicle body frame 5 extend upwards through a space between a rear seat portion 2b of a tandem seat 2 and an accommodating box 6 in a similar manner as in the rear seat cover supporting members 12 in the preferred embodiment illustrated in FIG. 2. The top ends of the extensions 5c are substantially at the same level as high as the top surface of the accommodating box 6. Pivotably mounted to these top ends, is the rear edge portion of the rear seat cover 9 similarly to the above-described embodiments. Reference numeral 18 designates a cover which covers the rear seat cover 9 and extending from its back surface over its both side portions. Reference numeral 19 designates a rear cowl covering rear side portions of the vehicle body. When the rear seat cover 9 takes its level position, the sides of the rear seat portion 2b are covered by the cover 18 and the rear cowl 19 with almost no gap clearance retained therebetween, and therefore, the dirt and dust are prevented from entering the gap space between the rear seat portion 2b and the rear seat cover 9.

What is claimed is:

1. A seat assembly for a motorcycle comprising:
   a tandem seat having a front and rear seat and positioned upon a frame between a front and rear wheel;
   an accommodating box positioned at the rear end of said tandem seat and having a height taller than said tandem seat; and
   a rear seat cover positioned between said tandem seat and accommodating box and being swingable between an upright and level position, wherein when said rear seat cover takes said level position, said rear seat cover substantially covers the whole surface of said rear seat and a top surface of said rear seat cover and said accommodating box form a substantially continuous even plane.

2. A rear cover seat according to claim 1, wherein said rear seat cover is swingable supported around a pivot portion fixed between said rear seat and said accommodating box and the front surface of said rear seat cover covers the top surface of said rear seat when it takes the level position.

3. A rear seat cover according to claim 1, wherein a reinforcement member is provided at the back side of said rear seat cover, said reinforcement member having side portions extending over both sides of the motorcycle.